United States Patent [19]

McDonnal

[11] Patent Number: 4,858,052
[45] Date of Patent: Aug. 15, 1989

[54] METHOD AND MEANS FOR PROTECTING CONVERTER CIRCUITS

[75] Inventor: John E. McDonnal, Campbell, Calif.
[73] Assignee: RO Associates, Sunnyvale, Calif.
[21] Appl. No.: 178,759
[22] Filed: Apr. 4, 1988

Related U.S. Application Data

[63] Continuation of Ser. No. 935,715, Nov. 28, 1986, abandoned.

[51] Int. Cl.⁴ .............................................. H02H 7/122
[52] U.S. Cl. ......................................... 361/18; 361/91;
361/88; 323/300; 323/303; 363/21; 363/56
[58] Field of Search ....................... 361/18, 58, 86, 91,
361/88, 111; 363/21, 56, 80, 78, 79; 323/300

[56] References Cited

U.S. PATENT DOCUMENTS 3,733,519  5/1973  Griffey .............................. 361/18 X
4,318,168  3/1982  Faxon ............................... 363/21 X
4,447,841  5/1984  Kent ...................................... 361/18

OTHER PUBLICATIONS

Unitrode Corporation; *Applications Handbook*, 1985-86; p. 16.
RO Associates; 1984-85 *Catalog, Switching Power Supplies*: pp. 27-35, "The Principles and Facts about Switching Power Supplies", Robert H. Okada; pp. 1-9; 1973.

*Primary Examiner*—Todd E. Deboer
*Attorney, Agent, or Firm*—A. C. Smith

[57] ABSTRACT

An improved method and means for protecting converter circuitry during input overvoltage and all load conditions includes a control circuit which reduces duty cycle below requisite conduction time for effective signal conversion with resulting reduction in load current.

6 Claims, 5 Drawing Sheets

METHOD AND MEANS FOR PROTECTING CONVERTER CIRCUITS

This is a continuation of co-pending application Ser. No. 935,715 filed on Nov. 28, 1986, now abandoned.

BACKGROUND OF THE INVENTION

Conventional converter circuits commonly operate by supplying voltage pulses of certain pulse height and width (called 'volt-second' magnitude herein) to one winding of a transformer, and by altering the pulse height or width of such voltage and current pulses in response to a control signal. The pulse height and width of signal available on another winding of the transformer are thus related to the applied voltage and current pulses. By altering the volt-second magnitude of the applied voltage pulses in inverse relationship to the applied voltage, the volt-second magnitude of the output from another winding of the transformer can be maintained reasonably constant. One difficulty encountered in circuits of this type is that the operating conditions of high applied voltage and high output load current can adversely affect the regulation process and overload the circuit components.

SUMMARY OF THE INVENTION

Accordingly, the method and means of the present invention alter the volt-second magnitude of the input or driving pulses to a converter circuit in inverse disproportionate relationship to the applied or input voltage. In addition, the present invention also includes regulator circuitry at the output of a transformer that requires output pulses from the transformer of minimum volt-second magnitude in order to regulate output voltage effectively. Accordingly, as the applied or input voltage increases, (for example, during line transients), the regulator circuitry decreases output, even under high load conditions, so that the circuit components are not overloaded and the converter circuit and associated load circuit are thereby protected from being destroyed as line voltage increases above rated value.

DESCRIPTION OF THE PREFERRED EMBODIMENT

Figure 1:
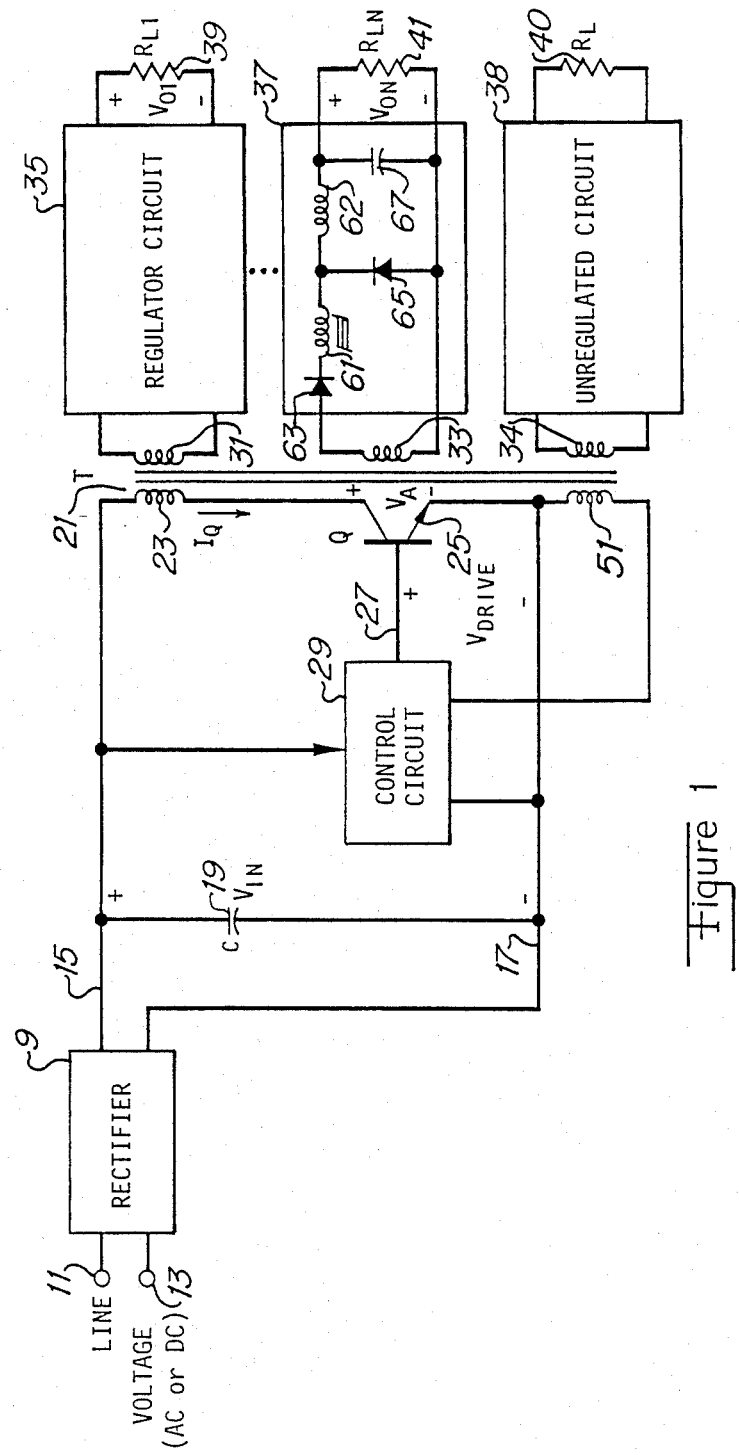
FIG. 1 is a schematic diagram of the preferred embodiment of the present invention.

Referring now to the schematic diagram of FIG. 1, there is shown a conventional rectifier 9 which is connected to receive the line voltage (either A.C. or D.C.) appearing at the input terminals 11 and 13. The D.C. output produced by rectifier circuit 9 appears on conductors 15 and 17 and is filtered by capacitor 19. Transformer 21 includes a primary winding 23 which is connected through switching transistor 25 to receive the DC voltage appearing on conductors 15 and 17. The switching transistor 25 is connected to receive control signal on line 27 from control circuit 29.

The transformer 21 also includes one or more secondary windings 31, 33, and each secondary winding is connected respectively to a regulator circuit 35, 37 which may be of the type described in detail later herein. Of course, non-regulating circuits 38 may also be connected to additional secondary windings 34 for supplying unregulated D.C. output voltage to a load 40. Each regulator circuit 35, 37 thus independently supplies output current to its respective load 39, 41, and may be of a type, as illustrated, which produce regulated D.C. output voltages from the pulses supplied thereto by the secondary windings 31, 33 of the transformer 21. Such circuits commonly require a pulse from the secondary windings of the transformer 21 having at least a minimum pulse height and duty cycle in order to convert such pulse effectively to D.C. output voltage and current in the respective load 39, 41. With such secondary regulator circuits, the primary circuit can simply be made to operate in a fixed duty cycle manner. However, such conventional regulation circuits are prone to magnetic saturation at high levels of applied voltage since the volt-second magnitude of signal applied to the transformer increases with increasing applied voltage.

In other conventional regulator circuits, a signal is commonly fed back from a regulator circuit on the secondary side of a transformer to a control circuit in the primary side of the transformer in order to control the duty cycle modulation of signal applied to the primary winding. In this conventional manner, the volt-second output of the secondary winding is maintained exactly at the duty cycle required to produce the requisite D.C. output voltage and current applied to a load.

However, in accordance with the present invention, the input signal to the primary winding 23 of transformer 21 need only be roughly controlled in inverse relationship to the voltage appearing across conductors 15 and 17 so that the pulse height and width of signal appearing at the secondary winding 31 is at least larger than the minimum required by the regulator circuit 35, 37 to maintain regulation of the D.C. output. Of course, the invention could also be made to operate in a circuit in which the duty cycle is precisely controlled in the conventional manner, as described above, when not operating in the protective mode of operation described herein.

In operation, the load on switching transistor 25 is the inductive primary winding 23 and the associated reflected secondary impedances. The maximum voltage that the switching transistor must withstand under rated operating limits normally occurs under conditions of maximum load on the regulator circuits 35, 37 and with maximum input voltage appearing on conductors 15 and 17.

For simplicity, in this description, it is assumed that the fall time of current through transistor 25 is substantially constant independent of the peak value of current during conduction. The control circuit 29 supplies to transistor 25 a control signal on line 27 that decreases the current conduction interval as the voltage on conductors 15, 17 increases. More importantly, the regulator circuits 35, 37 require an output pulse on the respective winding 31, 33 of minimum duty cycle in order to fully convert the pulse on the respective winding 31, 33 of given volt-second magnitude to corresponding output D.C. voltage and current.

Therefore, as the conduction period of transistor 25 is decreased (on high line voltage conditions) below the period required to produce the minimum duty cycle, the regulator circuit 35, 37 decrease in effectiveness of conversion to D.C. voltages and currents supplied to the fixed loads 39, 41, with the result that the current conducted by transistor 25 during the conduction period is also decreased. The conduction period of transistor 25 can be reduced below the period required to produce the minimum duty cycle either by maintaining a constant pulse frequency and decreasing the pulse width, or by maintaining a constant pulse width and decreasing the frequency of pulses, or by some combination of frequency and width modulation that results in a duty cycle less than that required by the regulator circuits to produce the corresponding D.C. output voltage and current. Thus, in contrast to shutting off the circuit under overvoltage operating conditions, the regulator circuits 35, 37 may continue to function properly to supply low levels of load current to respective loads 39, 41 even during such overvoltage conditions on conductors 15, 17 without exposing the transistor 25 to overvoltage during its non-conductive operating period.

Figure 2:
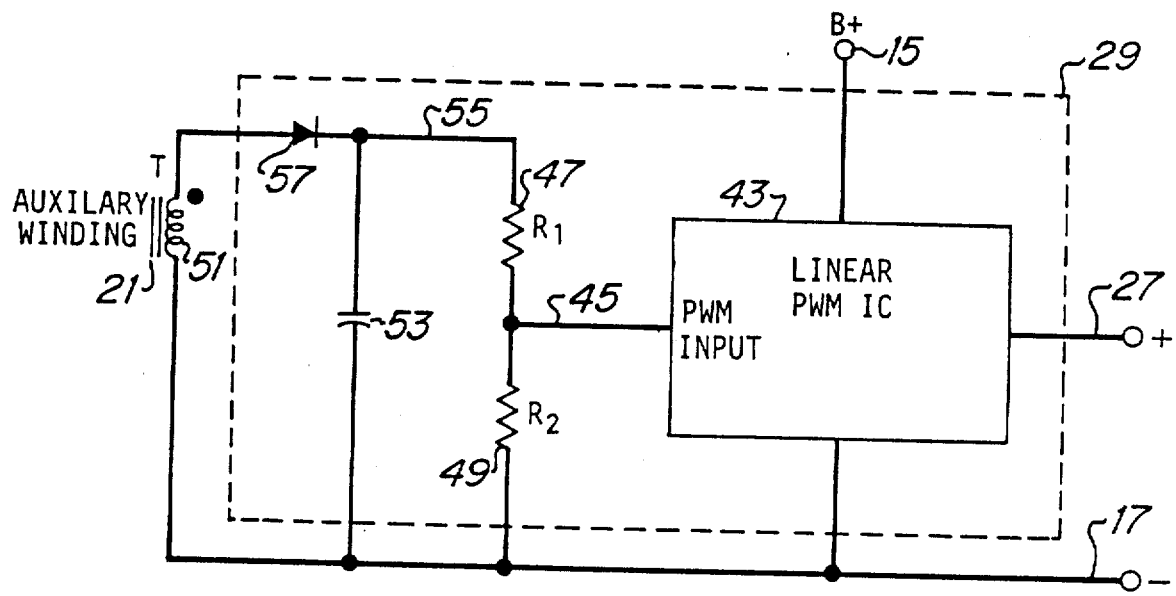
FIG. 2 is a schematic diagram of the preferred embodiment of the input control circuit.

Referring now to FIG. 2, there is shown a schematic diagram of the preferred embodiment of a circuit for operation as the control circuit 29. Specifically, a conventional linear pulse-width modulator in integrated circuit form (for example, type #TL494 available commercially from Texas Instruments) is connected to receive bias from conductors 15, 17, and a modulation control signal on input 45 from the potential divider comprising resistors 47 and 49. Alternatively, a conventional frequency modulator circuit may be connected in place of the pulse-width modulator circuit 43 to receive bias from conductors 15, 17 and a modulation control signal on input 45 from the potential divider comprising resistors 47 and 49. An auxiliary winding 51 on transformer 21 responds to the magnetic flux in the transformer to provide an output pulse that is rectified, filtered, and applied to the potential divider comprising resistors 47 and 49.

The auxiliary winding 51 on transformer 21 provides a signal which has a peak value that is essentially proportional to the voltage (Vin) on conductors 15, 17. The value of the capacitor 53 is selected to assure that the voltage appearing on conductors 55 and 17 supplied via diode 57 is essentially D.C. Then, it can be shown that the modulator control voltage of the input 45 of the linear I.C. 43 is:

$$V_{45} = \frac{\left(V_{in}\frac{N_{aux}}{NP} - VD\right) \cdot R_{47}}{R_{47} + R_{49}} \quad \text{Eq. (1)}$$

Where:

$V_{in}$ is the voltage on conductors 15, 17;

$N_{aux}$ is the number of turns on auxiliary winding 51;

NP is the number of terms on the primary winding 23; and $V_D$ is the forward voltage drop across diode 57.

This equation reduces to:

$$V_{45} = V_{in} \cdot x - k \quad \text{Eq. (2)}$$

Where:

$$x = \frac{R_{47}}{R_{47} + R_{49}} \cdot \frac{(N_{aux})}{Np} ; \text{ and} \quad \text{Eq. (3)}$$

$$k = \frac{VD \, R_{47}}{R_{47} + R_{49}} \quad \text{Eq. (4)}$$

Thus, where x and k are properly selected, the product of $V_{in}$ and the pulse width of the control signal 27 for transistor 25 decreases for increasing $V_{in}$. This is because the linear pulse-width modulation circuit 43 provides a control signal 27 with pulse width that is inversely proportional to the modulation control signal 45, and K becomes less significant as $V_{in}$ increases.

In typical switching converter circuits, the maximum voltage that the switching transistor is subjected to under rated conditions generally occurs when the transistor is switched off each cycle. In the present invention, the load on transistor 25 is primarily inductive during the switch-off period. This inductance includes the transformer open-circuit inductance, the transformer leakage inductance, and stray inductance. Therefore, the maximum voltage appearing across the transistor 25 over its operating cycle is highly dependent upon the current flowing in the transistor just before it is switched off. Specifically, the inductive voltage depends upon the rate of change of the current being switched off. Generally, the fall time of the current is independent of the peak value of the current (especially with power MOSFET's), so the maximum rate of change of current occurs under the same conditions that produce the maximum current, i.e. maximum loading of the regulator circuits 35, 37.

Thus, during the switched-off, open circuit condition of transistor 25, the voltage that appears thereacross is the additive combination of the voltage across conductor 15 and 17 and the inductive voltage produced by the decreasing current in winding 23. The specific operating conditions of maximum voltage on conductors 15, 17 (related to line voltage) and maximum load currents supplied by all the regulator circuits 35, 37 thus establish the maximum tolerable voltage across transistor 25 when in the switched-off condition. If the line voltage increases above these rated conditions, potentially destructive higher voltage would appear across transistor 25 when it is switched off.

Figure 3:
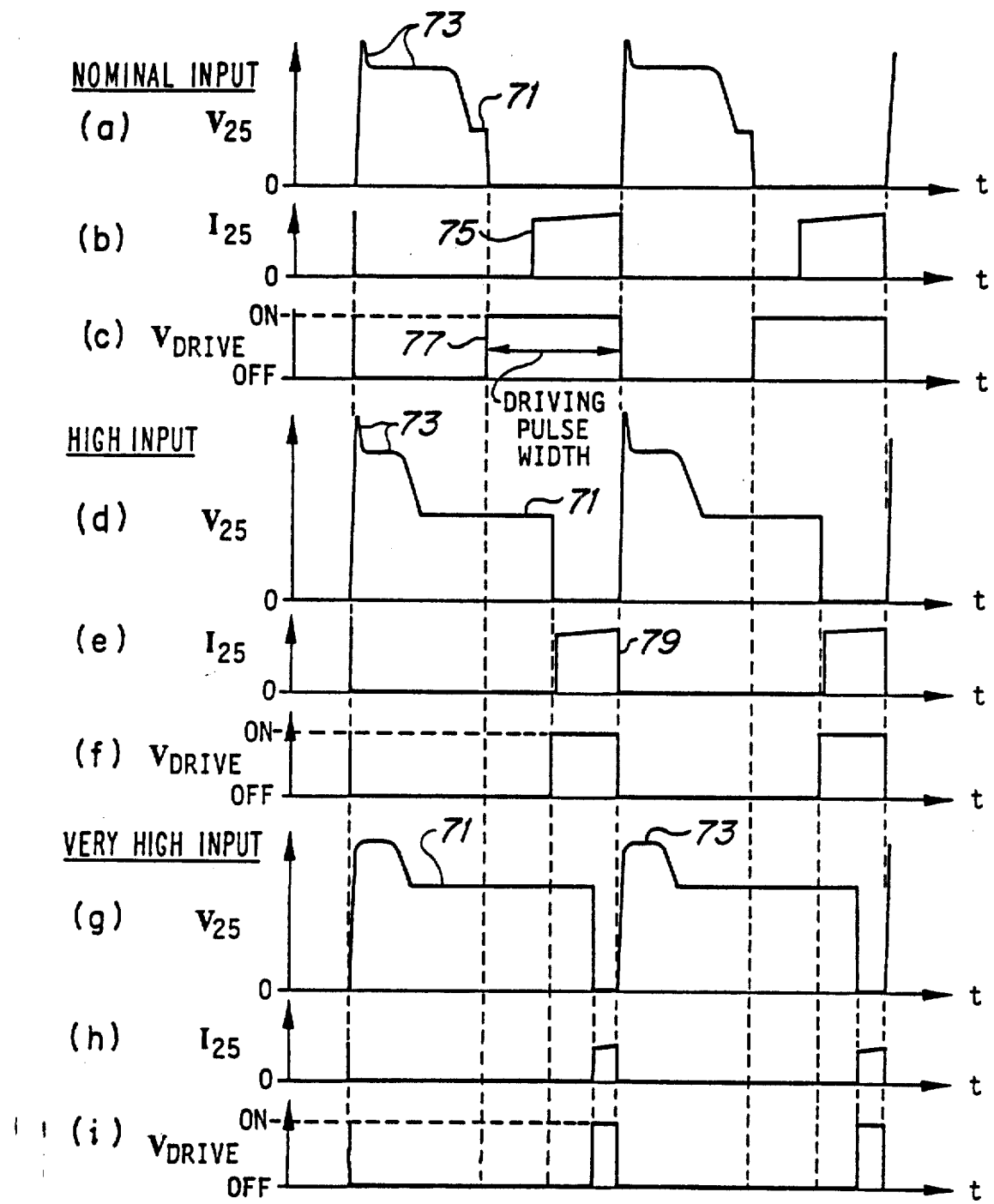
FIG. 3 is a graph illustrating the waveforms present during operation of the circuit of FIG. 1 in the pulse-width modulation mode.

However, in accordance with one embodiment of the present invention, the pulse width of the control signal 27 for operating above these rated limits decreases further, and thus produces correspondingly narrower pulses across the secondary windings 31, 33. The width or duration of such pulses are insufficiently long to enable the regulator cicruit 35, 37 to produce 100% of the rated output voltage and current. The load current thus decreases with decreasing pulse width, as illustrated in the graph of FIG. 3, and the decreased load current results in decreased current in winding 23 just before transistor 25 is switched off. Therefore, the current in, and the voltage across, winding 23 decreases with increasing line voltage in accordance with the present invention to assure that transistor 25 is protected from destructive over voltage under all operating load conditions.

Referring again to FIG. 1, the regulator circuit 37 may be of a type that includes a saturable reactor 61 and an inductor or choke 62 serially connected between a diode 63 and the load 41. Another diode 65 is connected in back-biased polarity between the junction of reactor 61 and diode 62 and the other load terminal. The output voltage appearing across the load is filtered by capacitor 67. In operation of such a typical regulator, at least a minimum duty cycle (i.e. conduction time of transistor 25) is required in order to effectively convert the pulse that appears on winding 33 during conduction of transistor 25 into D.C. voltage across load 41. As the conduction time decreases below such minimum duty cycle, the output voltage (and, hence, output current in the fixed load) decreases because of the time interval required for saturable reactor 61 to build up flux and attain saturation. Of course, other conventional regulator circuits, for example, of the types employing a pulse-width modulated or linear regulator, or unregulated secondary, also require a minimum duty cycle for effective conversion of signal on secondary winding 31, 33 to D.C. output voltage and current supplied to a load.

Referring now to the pictorial graphs of FIG. 3, there is shown in FIG. 3(a) a waveform with time representing the voltage appearing across the switching transistor 25 relative to the control signal (FIG. 3c) applied thereto on line 27 during operation of the circuit of FIG. 1. The level 71 represents the applied voltage on conductors 15,17, and the level 73 represents the overshoot voltage contributed by the decreasing current in winding 23 and transistor 25. The initial overshoot is contributed by the leakage and stray inductances. Of course, actual waveforms can be expected to include exponential rise and decay segments which have not been shown in FIG. 3 in order to simplify the illustration for purposes of clarity. The current through transistor 25 and winding 23 (FIG. 3b) begins to flow at a time 75 delayed from appearance 77 of the control signal (FIG. 3c) on line 27 due to delay in current flow through the regulator circuits 35, 37.

As the applied voltage on conductors 15,17 increases, the duration of the control signal (FIG. 3f) decreases, D.C. level 71 increases, and the overshoot portion 73 (FIG. 3d) increases in amplitude due to the collapsing flux in transformer 21.

At very high levels of applied voltage on conductors 15,17, the D.C. level 71 increases (FIG. 3g), but the overshoot portion 7 decreases due to less current in winding 23 and transistor 25. Less current in winding 23 and transistor 25 is due to the lower-amplitude, narrower pulse 79 of current flowing through winding 23 (FIG. 3h) during the shortened conduction time that is due to the control signal 27 (FIG. 3i) of lower duty cycle. The signals appearing on secondary windings 31,33 are less effectively converted to D.C. voltage and current in the respective loads 39,41 by the regulator circuits 35,37, as previously described, and this contributes to less current in winding 23 and transistor 25. The operating levels of flux in transformer 21 are maintained below saturation levels under all operating conditions to assure that current through transistor 25 cannot exceed rated limits under all possible conditions of line voltage and load currents.

Figure 4:
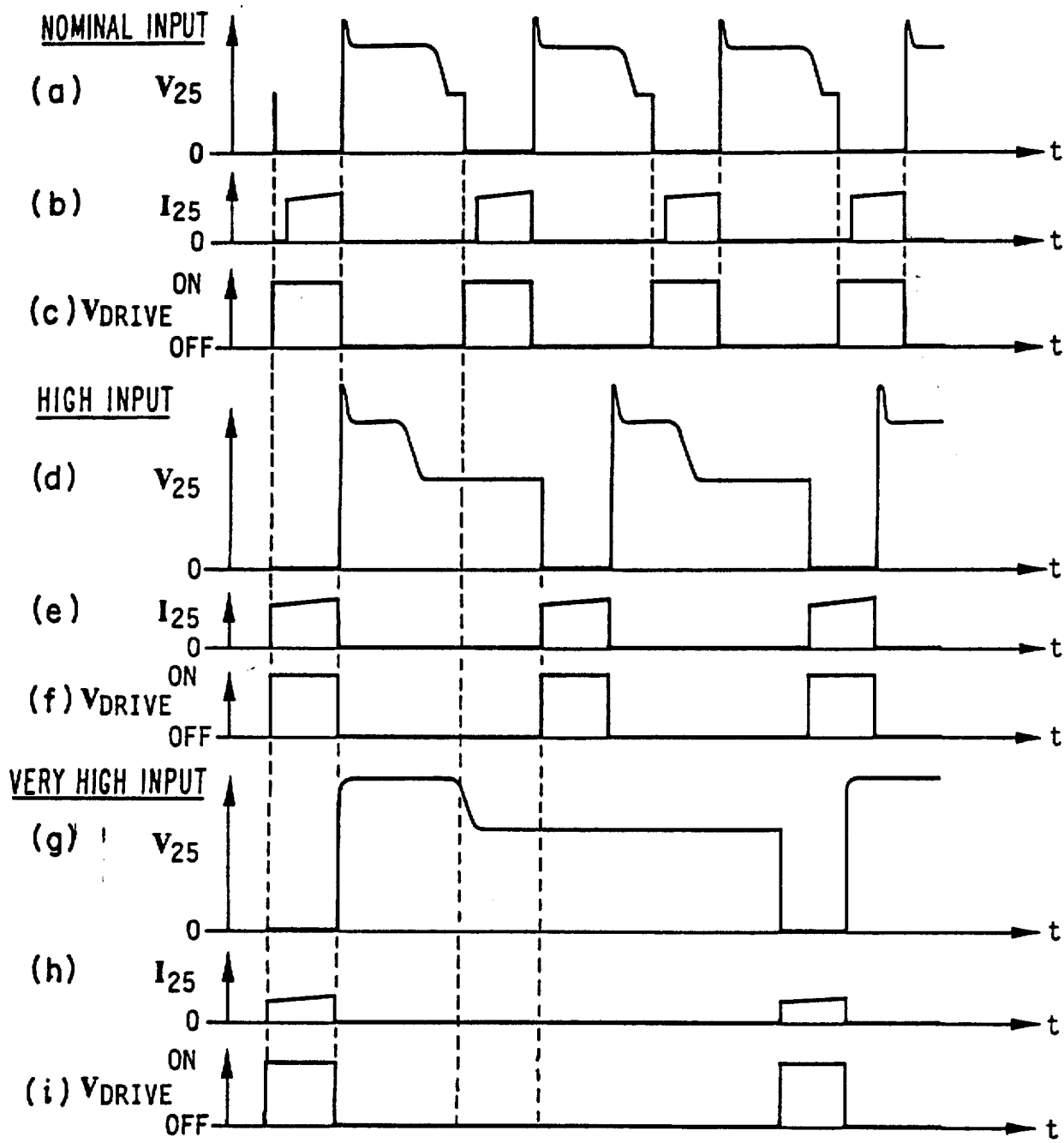
FIG. 4 is a graph illustrating the waveforms present during operation of the circuit of FIG. 1 in the frequency-modulation mode.

Referring now to FIG. 4, there is shown a graph of waveforms present in the circuit operating with frequency-modulating control circuit connected to control the conduction of transistor 25. These waveforms illustrate that the pulse width is maintained substantially constant as the pulse frequency changes inversely with line voltage. If the nominal frequency is low enough, the total conduction interval per unit period decreases to less than the minimum conduction interval required by the regulator circuits to produce the full D.C. outputs, as illustrated in FIGS. 4(g), (h) and (i), resulting in lower peak conduction current in transistor 25.

Figure 5:
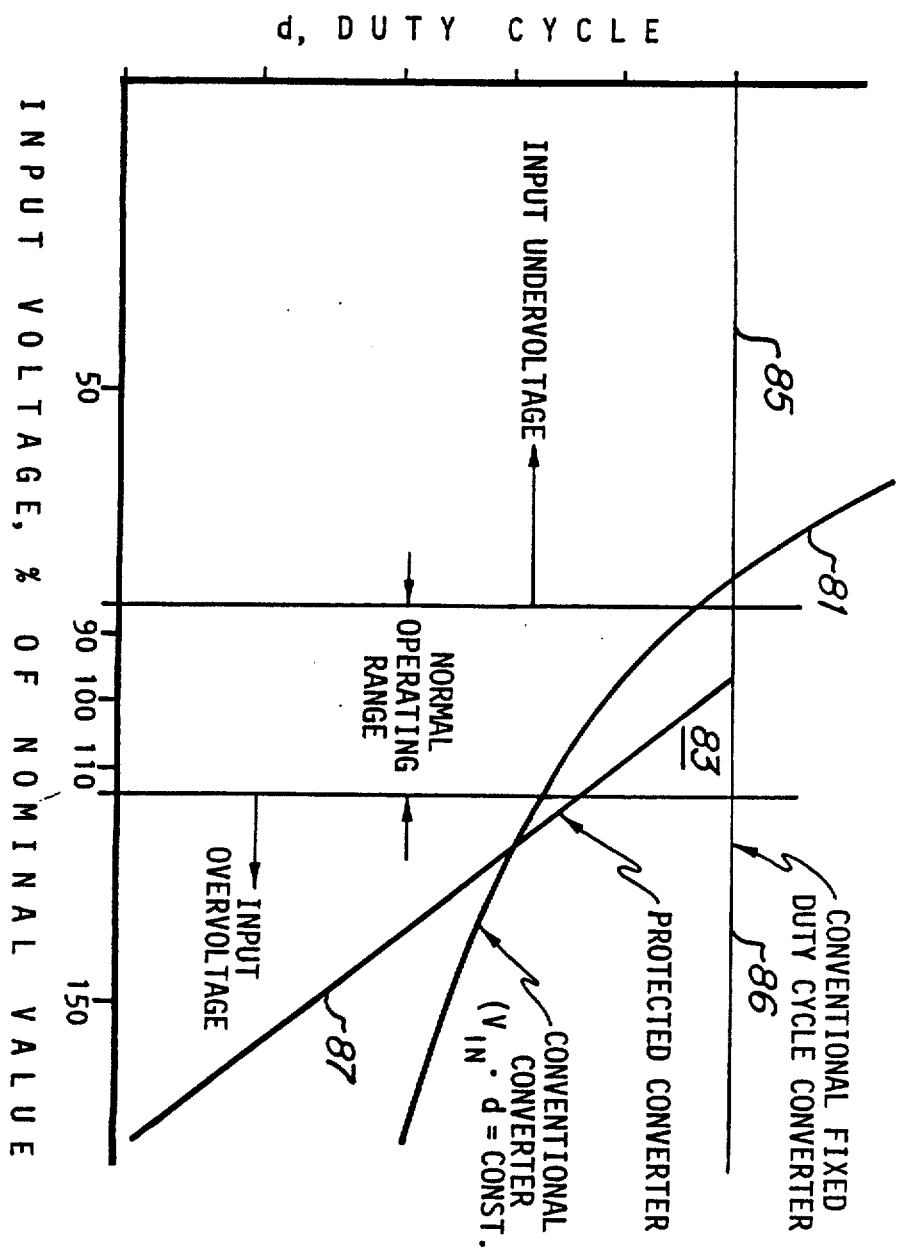
FIG. 5 is a illustrating the line voltage protection provided by the present invention compared with conventional converters.

Referring now to FIG. 5, there is shown a graph of duty cycle vs. percent of nominal value of the input voltage. This graph illustrates operation of a conventional fixed-duty cycle converter 86, and also shows the relationship between the duty cycle and the input voltage for a conventional converter, and for a converter protected according to the invention. The curve 81 for the conventional converter is an equilateral hyperbola (x y=constant) on the assumption that the converter efficiency is roughly constant versus input voltage for a given load. This curve 81 may also be considered to represent the shape of the minimum duty cycle required by conventional regulator circuits. In contrast, the curve 83 for a converter protected according to the present invention includes two linear segments 85, 87. The zero slope segment 85 represents fixed duty cycle operation at input voltages below nominal input voltage. The sloped segment 87 is substantially linear and has a negative slope as a result of circuit operation according to the invention. It should be noted from these curves that at about 175% of nominal input voltage, conventional converters without protection according to the invention would continue to operate at relatively high duty cycles with potentially destructive consequences, compared with a converter that is protected according to the invention which would operate at a reduced duty cycle to provide protection for the transistor 25 and associated components.

Therefore, the method and means of the present invention provides input overvoltage protection for a converter circuit operating under all condition of load current by reducing the duty cycle of current in the primary of the converter transformer below the minimum duty cycle required by a regulator circuit to effectively convert the signal on the secondary of the transformer to the D.C. output voltage and current supplied to a load.

I claim:

1. The method of protecting from input overvoltage conditions circuitry which operates on the periodic conduction in a winding of a transformer of current from a source that operates on the input voltage to convert signal on another winding of the transformer into D.C. output voltage supplied to a load, the method comprising the steps of:

supplying current to one winding of the transformer periodically during controllable conduction intervals from the source that operates on the input voltage;

altering the duty cycle of the conduction interval in response to the amplitude of voltage of the source from which current is supplied to said one winding of the transformer;

converting the signal on another winding of the transformer into the D.C. output voltage which decreases in amplitude in response to the conduction of current in one winding of the transformer for duty cycles of conduction interval shorter than the minimum duty cycle of conduction interval required to maintain the D.C. output voltage substantially constant; and decreasing the duty cycle of the conduction interval continuously to shorter than said minimum duty cycle of conduction interval in response to the amplitude of said voltage from the input voltage source exceeding a predetermined limit to protect the circuitry against input overvoltage.

2. The method according to claim 1 wherein in the step of converting, the effectiveness with which the signal appearing on another winding of the transformer is converted into D.C. output voltage supplied to a load decreases with decrease of the duty cycle of the conduction interval to shorter than said minimum duty cycle of conduction interval.

3. A circuit to convert applied voltage from an input voltage source to D.C. output voltage in a load, comprising:

a transformer having first and second windings;

switch means connected to conduct applied voltage from the input voltage source through the first winding in response to applied control signal;

circuit means connected to the second winding to convert signal appearing thereon into D.C. output voltage, said circuit means producing said D.C. output voltage of decreased amplitude in response to signal appearing on the second winding having a duty cycle less than a minimum duty cycle of the conduction interval required to maintain the D.C. output voltage substantially constant; and control means coupled to supply control signal to said switch means at periodic intervals which are controllable in duration in response to the amplitude of the applied voltage from the input voltage source, said control means decreasing the duty cycle of the conduction interval continuously to shorter than said minimum duty cycle of conduction interval in response to the applied voltage from the input voltage source exceeding a predetermined limit for protecting the circuit from input overvoltage.

4. A circuit as in claim 3 wherein said control means decreases the duty cycle of the conduction interval to shorter than said minimum duty cycle of conduction interval in decreasing disproportionate relationship to the amplitude of the applied voltage from the input voltage source for values thereof in excess of said predetermined limit.

5. A circuit as in claim 3 comprising:

rectifier means coupled to receive line voltage to produce said applied voltage of unidirectional polarity with an amplitude related to said line voltage; and said control means decreases the duty cycle of the conduction interval to shorter than said minimum duty cycle of conduction interval in decreasing disproportionate relationship to the amplitude of said line voltage for values thereof in excess of a selected limit.

6. A circuit as in claim 3 wherein the transformer is operated at levels of magnetic flux therein below saturation.

* * * * *

UNITED STATES PATENT AND TRADEMARK OFFICE
CERTIFICATE OF CORRECTION

PATENT NO.  : 4,858,052
DATED       : August 15, 1989                        Page 1 of 5
INVENTOR(S) : John E. McDonnal It is certified that error appears in the above-identified patent and that said Letters Patent is hereby corrected as shown below:

Figures 2, 3, 4 and 5 should be added as per attached sheets.

Signed and Sealed this

Third Day of April, 1990

Attest:

HARRY F. MANBECK, JR.

*Attesting Officer*     *Commissioner of Patents and Trademarks*